(12) United States Patent
Kulkarni et al.

(10) Patent No.: US 7,534,911 B2
(45) Date of Patent: May 19, 2009

(54) PROCESS FOR THE PREPARATION OF ISOSULPHAN BLUE

(75) Inventors: Balkrishna K Kulkarni, Maharashtra (IN); Sankar Chinnakulandai, Maharashtra (IN); Girish M Khandekar, Maharashtra (IN); Hawaldar T. Maurya, Maharashtra (IN); Ashok Vamanrao Arjun, Maharashtra (IN); Sandeep S. Sope, Maharashtra (IN); Sumit Kar, Maharashtra (IN)

(73) Assignee: Innovassynth Technologies (India) Ltd., Mumbai (IN)

( * ) Notice: Subject to any disclaimer, the term of this patent is extended or adjusted under 35 U.S.C. 154(b) by 90 days.

(21) Appl. No.: 11/278,641

(22) Filed: Apr. 4, 2006

(65) Prior Publication Data

US 2006/0224003 A1    Oct. 5, 2006

(30) Foreign Application Priority Data

Apr. 4, 2005    (IN)    ................ 420/MUM/2005

(51) Int. Cl.
*C07C 309/29*    (2006.01)
*C07C 309/32*    (2006.01)

(52) U.S. Cl. ................ 562/59; 562/41; 562/58
(58) Field of Classification Search ........ 562/66, 562/46

See application file for complete search history.

(56) References Cited

U.S. PATENT DOCUMENTS 1,531,507 A * 3/1925 Rosenbaum ............. 562/46
3,592,580 A * 7/1971 Hoffmann ................. 8/518
5,777,139 A * 7/1998 Bouchard et al. ......... 549/510

OTHER PUBLICATIONS

Heller, G. The alkali fastness of patent blue dyes Chemiker-Zeitung (1932),56,902-3 (please see the abstract).*
Agunwa et al. Journal of Chemical society of Nigeria 2000, 25, pp. 105-108.*
Agunwa et al. Journal of Chemical society of Nigeria 2001, 26(1), pp. 128-130.*
Ukoha et al Journal of Chemical Society of Nigeria 2001, 26(1), pp. 81-86.*

* cited by examiner

*Primary Examiner*—Daniel M. Sullivan
*Assistant Examiner*—Yevgeny Valenrod

(57) ABSTRACT

A process for the preparation of Isosulphan Blue is disclosed. The process comprises the following steps: Sulphonating orthochlorobenzaldehyde, treatment with sodium sulphite, basification, condensation and oxidation to obtain Isosulphan Blue.

7 Claims, No Drawings

PROCESS FOR THE PREPARATION OF ISOSULPHAN BLUE

FIELD OF INVENTION

This invention relates to an improved process for the manufacturing of Isosulphan Blue, which avoids usage of stronger oxidizing agent for the oxidation reaction.

More particularly, this method relates to a process for manufacturing Isosulphan Blue from orthochlorobenzaldehyde.

DEFINITIONS

"Lower alkanols" means respective alcohols of lower alkanes containing 1 to 4 carbon atoms, such as Methyl alcohol, Ethyl alcohol, Propyl alcohol, Butyl alcohol.

"Sulphonation" means addition of sulphonic acid group to the compound by reacting it with a sulphonating agent like sulfuric acid, oleum.

"Condensation" means a chemical reaction in which two molecules or moieties react and become covalently bonded to one another by the concurrent loss of a small molecule.

"TLC" means Thin layer chromatography.

"HPLC" means High Performance Liquid Chromatography.

BACKGROUND

1. Introduction

Isosulphan Blue is a reagent used in diagnostic kits for detecting cancer cells.

Isosulphan Blue (Molecular formula: $C_{27}H_{31}N_2NaO_6S_2$) is also known as sodium salt of N-[4-[4-(diethylamino)phenyl](2,5-disulfophenyl)methylene]2,5-cyclohexadien-1-ylidene]-N-ethyl-ethanaminium hydroxide.

Chemical Structure:

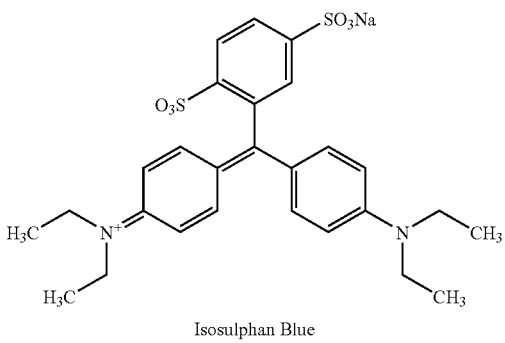

Isosulphan Blue

2. Prior Art

Isosulphan Blue has been manufactured by using 4-formyl benzene-1,3-disulphonic acid and Diethylaniline followed by oxidation with lead oxide or potassium dichromate as an oxidizing agent.

U.S. Pat. No. 1,531,507 has disclosed a scheme in which the intermediate 4-formyl benzene-1,3-disulphonic acid sodium salt is prepared by sulphonation of orthochlorobenzaldehyde using oleum 26% and oleum 65% followed by reaction with sodium sulphite.

The process disclosed in the above mentioned patent is shown in scheme I below:

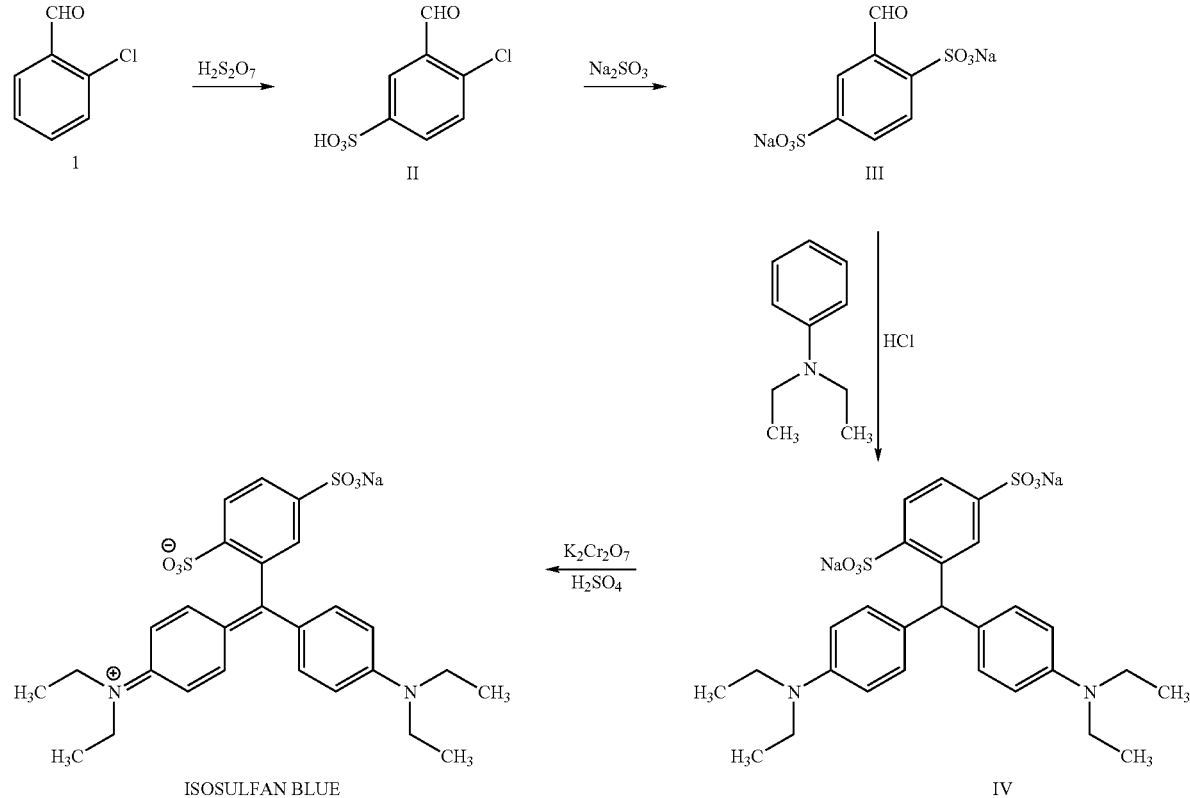

However, oxidising agents like lead oxide or potassium dichromate lead to over oxidized products.

Furthermore, traces of lead remaining in the final compound can produce toxic effects (lead poisoning) in the recipients.

This is a significant limitation of the prior art manufacturing process mentioned above.

SUMMARY OF THE INVENTION

The present invention provides for an improved process for the preparation of Isosulphan Blue, wherein the drawbacks of the prior art processes mentioned hereinabove are overcome by use of suitable reagents.

In accordance with this invention, there is envisaged a process which does not use potentially carcinogenic or toxic agents for the oxidation reaction.

In accordance with another aspect of this invention, there is provided a process for the manufacture of Isosulphan Blue using a mild oxidising agent and thereby preventing over oxidation of the substrates.

According to this invention, there is provided a process for the preparation of Isosulphan Blue, said process comprising the following steps:
(a) sulphonating orthochlorobenzaldehyde with a sulphonating agent to obtain 4-chloro-3-formyl sulphonic acid.
(b) treating 4-chloro-3-formyl sulphonic acid with sodium sulphite and subsequent basification to obtain 1-formyl benzene-2,5-sulphonic acid disodium salt.
(c) condensation of 1-formyl benzene-2,5-sulphonic acid disodium salt with N,N-diethylaniline using Hydrchloric acid to obtain a 4-[Bis[4-(diethylamino)phenyl]methyl] benzene-2,5-disulphonic acid disodium salt.
(d) oxidation of 4-[Bis[4-(diethylamino)phenyl]methyl]benzene-2,5-disulphonic acid with an oxidizing agent, using an acid and a solvent, to obtain Isosulphan Blue.

Typically, oleum in the concentration range of 20% to 70% are used to obtain 4-chloro-3-formyl sulphonic acid.

Typically, condensation is carried out at a temperature range of 80-110° C.

Typically, condensation is carried out for 6 to 20 hours.

Typically, 4-[Bis[4-(diethylamino)phenyl]methyl]benzene-2,5-disulphonic acid disodium salt is isolated at a pH range of 9 to 13.

Typically, Ammonium dichromate is used as the oxidizing agent.

Typically, the solvent is selected from a group of solvents consisting of loweralkanols of $C_{(1-4)}$.

Typically, an acid is aqueous sulphuric acid in the concentration range of 20 to 60%.

DETAILED DESCRIPTION

Synthetic Reaction Parameters

For Step (c):

This step is carried out at temperatures ranging from 45 to 110° C., preferably 80-110°, more preferably 100-110° C. for the time ranging from 6 to 20 hours, preferably 10 to 14 hours, more preferably 12 hours.

The crude product is crystallized in ethanol, preferably 95% ethanol. For isolation the product pH is maintained at 9 to 13, preferably 11.5 to 12

For step (d)

Oxidation of the intermediate compound to Isosulphan Blue is achieved by oxidation using ammonium dichromate and sulphuric acid at temperature ranging from 0 to 50° C., preferably 0 to 5° C.

Solvents that can be used in step (d) are $C_{(1-4)}$ alkanols preferably methanol and ethanol, most preferably methanol.

The concentration of sulphuric acid is in the range of 20 to 60%, preferably 40%.

The pH of the alcohol solution is adjusted to 7 to 12 preferably 8 to 9. Maintenance for pH adjustment is carried out for 8 to 16 hours, preferably 10-14 hours, most preferably 12 hours.

Details of the Processes

This invention provides a process for manufacturing Isosulphan Blue starting from orthochlorobenzaldehyde by the following steps as shown in Scheme-II Scheme-II

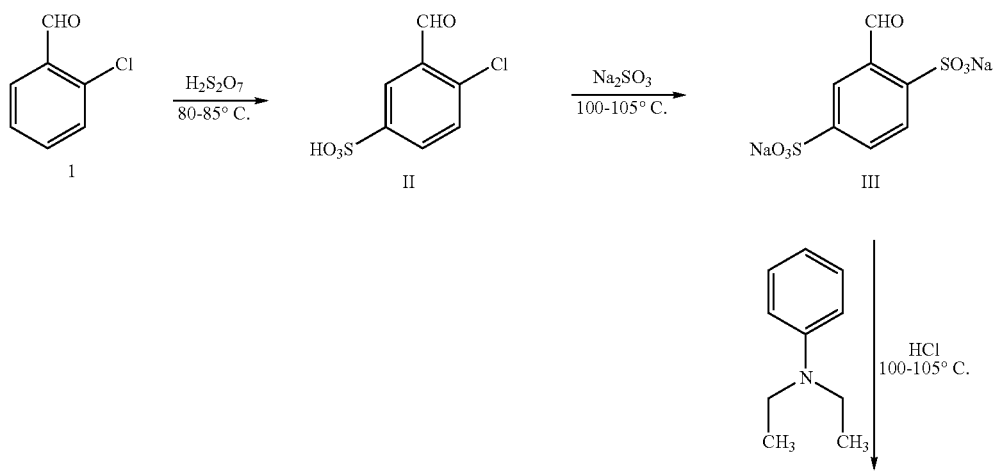

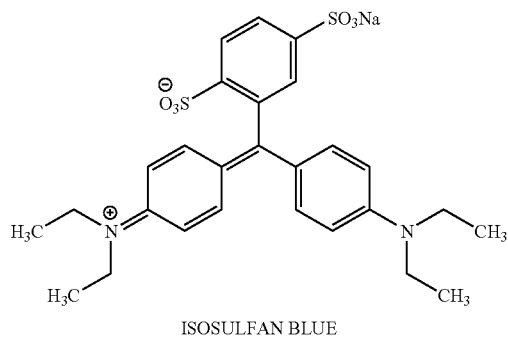

ISOSULFAN BLUE

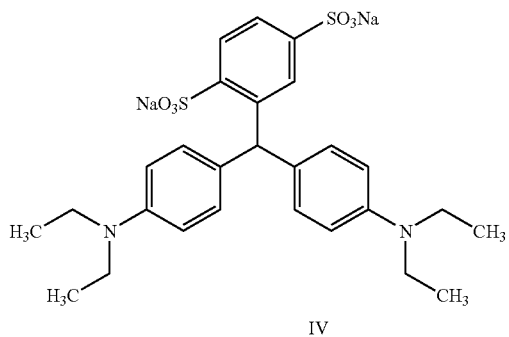

IV

Step (a) sulphonating orthochlorobenzaldehyde with a sulphonating agent to obtain 4-chloro-3-formyl sulphonic acid.

In this step, sulphonation of orthochlorobenzaldehyde is carried out with a sulphonating agent. Typically oleum 23% and oleum 65% are used to obtain 4-chloro-3-formyl sulphonic acid.

Step (b) treating 4-chloro-3-formyl sulphonic acid with sodium sulphite and subsequent basification thereof to obtain 1-formyl benzene-2,5-sulphonic acid disodium salt.

In this step, sodium salt of 4-chloro-3-formyl sulphonic acid is further reacted with sodium sulphite followed by basification (alkalination) resulting in the formation of disodium salt of 2,5-disulphonic benzaldehyde.

Step (c) condensation of 1-formyl benzene-2,5-sulphonic acid disodium salt with N,N-diethylaniline using Hydrchloric acid. 2,5-disulphonic benzaldehyde disodium salt is condensed with diethyl aniline in the presence of hydrochloric acid to obtain, 4-[Bis[4-(diethylamino)phenyl]methyl]benzene-2,5-di sulphonic acid disodium salt as an intermediate compound.

This step is typically carried out at a temperature range of 80-110° C. for 6 to 20 hours.

Step (d) Oxidation of the intermediate compound with a mild oxidizing agent

The intermediate compound obtained in step (c) is oxidized with a mild oxidising agent and with aqueous sulphuric acid with concentration in the range of 20 to 60% to obtain Isosulphan Blue.

Typically ammonium dichromate is used as a mild oxidizing agent.

Typically the solvent is selected from a group of solvents consisting of alkanols of $C_{(1-4)}$ like methanol.

The following specific examples are presented to illustrate the preferred mode of carrying out the process of the present invention. The examples are not limited to the particular embodiments illustrated herein but include the permutations, which are obvious as set forth in the forgoing description.

EXAMPLES

Preparation of
2-Chloro-1-formylbenzene-5-sulphonic acid (II)

2-chlorobenzaldehyde 500 g (3.35 moles) was added to 23% oleum 1050 g (1.35 moles), and the contents were cooled to 0 to 5° C. The reaction mixture was stirred for 2.5 hours between 0-15° C. To this stirred solution, 660 g of 65% oleum (2.41 moles) was added over a period of 2.5 hours, maintaining the temperature below 15° C. The reaction mass was stirred and allowed to come to a temperature of 25-30° C.

The reaction mass was then heated to 80-85° C. and was maintained at that temperature for 3 hours.

The reaction was monitored by HPLC. After completion of the reaction, the mass was quenched with 1500 gms of cold water over a period of two hours, maintaining the temperature below 40° C. It was further cooled to 20-25° C. At this temperature, finely powdered sodium chloride (1200 gms) was added under stirring.

The reaction mass was further cooled to 0-5° C. and was stirred for three hours. The precipitated product was filtered and dried to give 1900 gms of the product including inorganics.

Preparation of 1-formyl benzene-2,5-sulphonic acid disodium salt (III)

1900 gms of 2-chloro-1-formyl-benzene-5-sulphonic acid (along with inorganics) was added to 4200 gms of water and was stirred for 30 minutes at 25-30° C. till complete dissolution of the material. pH of the solution was adjusted to 6.5 to 7.5 with 40% sodium hydroxide solution (~6.25 moles) keeping the temperature below 45° C.

The clear solution was cooled to 30° C. and sodium sulphite powder 440 g (3.49 moles) was added followed by addition of water (640 g)

The reaction mass pH was between 11.5 to 12.5.

The reaction temperature was increased to 100-105° C. This temperature was maintained for 12 hours. The reaction completion was monitored by HPLC.

After the completion of the reaction, water was distilled out from the reaction mass at 500-600 mm vacuum maintaining the temperature below 85° C. The thick residual mass was cooled to 25-30° C. and this was taken as such for the next step.

Preparation of 4-[Bis[4-(diethylamino)phenyl]methyl]benzene-2,5-disulphonic acid disodium salt (IV)

A mixture of 1-formyl benzene-2,5-sulphonic acid disodium salt from the above reaction and N,N-diethylaniline 1696 g (11.38 moles) were stirred at 30° C. to form a uniform slurry.

To this concentrated hydrochloric acid 530 gms (5.06 moles) was added below 45° C.

The content was refluxed for twelve hours. The reaction was monitored by HPLC.

When the assay reached more than 60%, reaction mass was cooled to 30° C., filtered in vacuum and suction dried, the residue was washed with 500 gms of water thrice and suction dried for one hour. Wet cake thus obtained, was further washed with 250 ml of methanol to give 540 gms of crude product.

To the crude product, 95% ethanol (1500 ml) was added and stirred for 30 minutes, pH of the mass was adjusted to 11.5 to 12 with concentrated sodium hydroxide solution (250 gms of sodium hydroxide in 305 ml of water). Stirring was continued for 30 minutes and pH was checked again. pH was maintained at 11.5-12.

The precipitated salt was filtered, washed with 200 ml of 95% ethanol. The filtrate was concentrated under vacuum (150 mm of Hg) till dryness.

Hexane (500 ml) was added to the cooled residue and was stirred for 1 hour. The product was filtered and dried in vacuum oven at 60-70° C. to yield 500 gms of product.

(N-4-[4-(Diethylamino)phenyl]2,5-disulphophenyl) methylene]2,5-cyclo hexadien-1)ylidene]-N-ethyl-ethanaminium inner salt sodium salt 500 gms (0.847 moles) of N-4-[4-Diethylamino]phenyl]2, 5-disulphonic acid disodium salt was dissolved in 1000 ml of methanol.

The solution was cooled to 0-5° C. under stirring. Ammonium dichromate salt 82.6 g (0.327 moles) was added in five equal lots. To the reaction mass, 40% sulphuric acid (1060 ml) was added drop wise at 0 to 5° C. over a period of 45 minutes. The reaction mixture was then stirred at 0 to 5° C. for 2 hours.

Reaction was monitored by TLC. After completion of the reaction, reaction mass was filtered through Buchner funnel to remove the inorganics.

The residue was washed with 200 ml of methanol. Filtrates were mixed and sodium carbonate 625 g (5.89 moles) was added to adjust the pH. Stirring was continued for 12 hours more, to get pH between 8 to 9. The inorganics were filtered and the wet cake was washed with 1000 ml of methanol. The filtrate was concentrated under vacuum below 50° C. to get 400 g of Isosulphan Blue (83%).

Isosulphan Blue is also used as a constrast agent to identify lymphatic vessels in high retroperitoneal ligation of adolescent varicocele and for detecting post operative lymphatic vessel leaks. It is an adjunct to lymphography (in primary and secondary lymphedema of the extremities; chyluria, chylous ascites or chylothorax; lymph node involvement by primary or secondary neoplasm; for visualization of the lymphatic system draining the region of injection.

It is a very safe dye though some cases of anaphylactic shock following administration of Isosulphan Blue have been reported. It does interfere with the estrogen-receptor protein (ERP) binding capacity assay, when used in localization of occult breast cancer unlike methylene blue.

While considerable emphasis has been placed herein on the specific steps of the preferred process, it will be appreciated that many steps can be made and that many changes can be made in the preferred steps without departing from the principles of the invention. These and other changes in the preferred steps of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A process for the preparation of Isosulphan Blue, said process comprising the following steps:
    (a) sulphonating orthochlorobenzaldehyde with a sulphonating agent to obtain 4-chloro-3-formyl sulphonic acid;
    (b) treating 4-chloro-3-formyl sulphonic acid with sodium sulphite and subsequent basification thereof to obtain 1-formyl benzene-2,5-sulphonic acid disodium salt;
    (c) condensation reacting of 1-formyl benzene-2,5-sulphonic acid disodium salt with N,N-diethylaniline using hydrochloric acid to obtain a 4-[Bis[4-(diethylamino) phenyl]methyl]benzene-2,5-disulphonic acid disodium salt
    (d) oxidation reacting of 4-[bis[4-(diethylamino)phenyl] methyl]benzene-2,5-disulphonic acid with ammonium dichromate as an oxidizing agent, using an acid and a solvent, to obtain Isosulphan Blue.

2. The process as claimed in claim 1, wherein the sulfonating agent is oleum in a concentration range of 20 to 70%.

3. The process as claimed in claim 1, wherein the condensation is carried out at a temperature range of 80-110° C.

4. The process as claimed in claim 1, wherein the condensation is carried on for 6 to 20 hours.

5. The process as claimed in claim 1, wherein 4-[Bis[4-(diethylamino)phenyl]methyl]benzene-2,5-disulphonic acid disodium salt is isolated at a pH range of 9 to 13.

6. The process as claimed in claim 1, wherein the solvent is selected from a group of solvents consisting of methanol, ethanol, pronanol, isopropanol, butanol and isobutanol.

7. The process as claimed in claim 1, wherein the acid is an aqueous sulphuric acid in a concentration range of 20 to 60%.

* * * * *